Dec. 29, 1931.   G. W. McKEE   1,838,778
METER CONNECTING DEVICE
Filed March 31, 1930
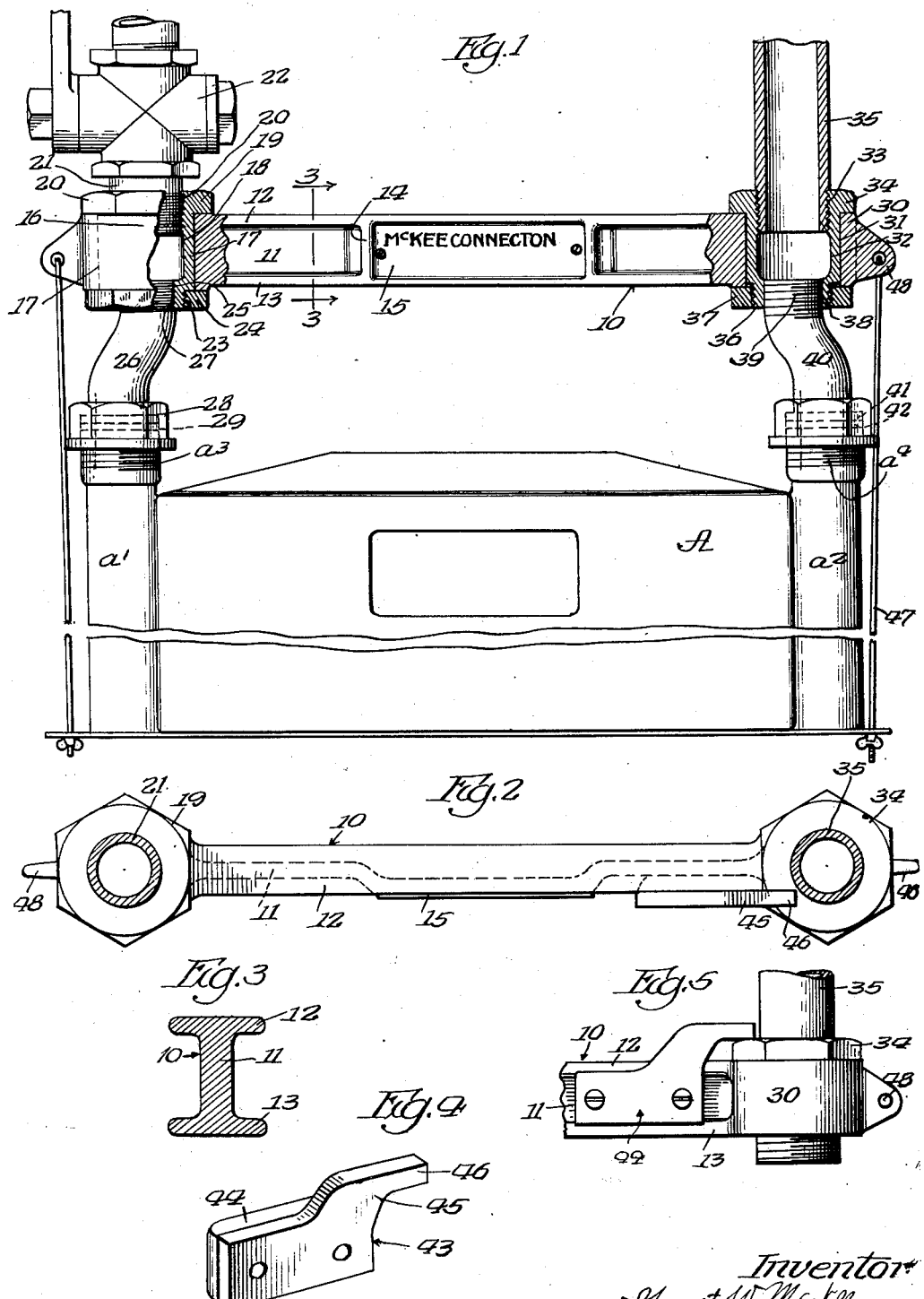

Patented Dec. 29, 1931

1,838,778

REISSUED

UNITED STATES PATENT OFFICE

GARNET W. McKEE, OF ROCKFORD, ILLINOIS

METER CONNECTING DEVICE

Application filed March 31, 1930. Serial No. 440,180.

The present invention relates generally to devices for use in connecting meters to gas supply and service pipes. More particularly the invention relates to that type of meter connecting device which consists of a rigid or non-adjustable crossbar, an offset nipple which depends from one end of the bar, receives gas from the supply pipe at the upper end thereof and embodies a coupling ring at its lower end whereby it may be attached to the inlet tube of the gas meter, and a second depending offset nipple which embodies at its lower end a coupling ring whereby it may be attached to the outlet tube of the meter and has its upper end connected to the other end of the crossbar and adapted for association with the service or gas delivery pipe.

In some constructions of meter connecting devices of this type the upper ends of the offset nipples are connected to the crossbar by vertically extending sleeves or hollow members which have the upper ends thereof tapped for connection to the gas supply and service pipes and are rotatably mounted in circular sockets at the ends of the crossbar so that the fitter or operator, during installation, may swing the lower ends of the nipples towards or away from each other and effect the proper position of the coupling rings relatively to the tubes of the meter. Heretofore the crossbar has been provided with means for locking the sleeves against axial displacement and the construction and arrangement of the sleeves has been such that during installation it is necessary to effect connection of the tapped ends of the sleeves and gas supply and service pipes by turning or rotating the sleeves while they are in place in the sockets at the ends of the crossbar. In practice difficulty is experienced in making the installation by virtue of the fact that the gas supply and service pipes are sometimes disposed too far apart or too close together and it is necessary to hold them in the proper position during turning of the sleeves for connection purposes.

The primary object of this invention is to provide a meter connecting device of the type that embodies sleeves for supporting rotatably the nipples for the inlet and outlet tubes of the meter, in which installation thereof is facilitated by virtue of the fact that the sleeves are removable from the crossbar and are so formed and arranged that in connection with the installation of the device they may be applied or connected separately to the gas supply and service pipes and then inserted into the sockets at the ends of the crossbar. In general the construction of the sleeves comprehends polygonal shoulders at the upper ends of the sleeves for engagement by a wrench or similar turning tool and external screw threads at the lower ends whereby nuts may be applied to hold the sleeves against displacement in the sockets and relatively to the crossbar.

Another object of the invention is to provide a meter connecting device which is an improvement upon that disclosed by me in an application for Letters Patent of the United States filed July 5, 1928, and serially numbered 290,376.

In addition it is contemplated as one of the objects of the invention providing a meter connecting device of the type under consideration which is generally of new and improved construction and in which facility of adjustment of the various parts is combined with durability and compactness of construction.

Other objects and the various advantages of the present construction will be apparent to those skilled in the art from a consideration of the following detailed description.

The invention consists in the several novel features which are hereinafter set forth and are more particularly defined by the claim at the conclusion hereof.

In the drawings which accompany and form a part of this specification or disclosure and in which like numerals of reference denote corresponding parts throughout the several views:

Figure 1 is a vertical longitudinal sectional view of a meter connecting device embodying the invention, illustrating in detail the construction and arrangement whereby the sleeves are connected removably to the crossbar and may be first connected to the gas pipes and then inserted into the sockets in the ends of the crossbar during installation of the device;

Figure 2 is a plan view;

Figure 3 is a section taken on the line 3—3 of Figure 1 and showing in detail the I-beam construction of the crossbar;

Figure 4 is a perspective of a tool which is shiftable into interlocking relation with the crossbar and is adapted primarily for use in holding the sleeves in the sockets in the ends of the crossbar during installation of the device; and Figure 5 is a side elevational view of the crossbar, disclosing the manner in which the tool is shiftable into engagement with the polygonal shoulder on one of the sleeves during connection of such sleeve to the crossbar.

The invention is exemplified in connection with a gas meter A of the type that is now in general use and embodies a vertical inlet tube $a'$ at one side thereof and a vertical outlet tube $a^2$ at the other side. The tubes $a'$ and $a^2$ are formed integrally with the meter casing and are provided at their upper or distal ends with external screw threads $a^3$ and $a^4$ respectively.

The connecting device which forms the subject matter of the present invention comprises a rigid or non-adjustable crossbar 10. This bar is formed of a one-piece casting and is preferably made of iron. The central portion of the crossbar corresponds in cross section to an I-beam or similar structural element and comprises a vertical web 11, a top flange 12 and a bottom flange 13. The flanges project laterally from both sides of the web and operate to reinforce the crossbar horizontally. The central portion of the vertical web 11 is offset relatively to the end portions as indicated in Figures 1 and 2 of the drawings, in order to form a flat part 14 which is flush with the front edges of the flanges 12 and 13 and is adapted for the reception of a name plate 15. By forming the crossbar in the manner set forth only a minimum amount of metal need be used. Furthermore it is practically impossible due to the comparatively small width of the web and the use of the offset part 14 to steal gas by drilling a longitudinal port through the bar.

One end of the crossbar 10 is shaped to form a vertically extending cylindrical member 16. The top and bottom faces of this member are substantially flush with the top surface of the flange 12 and the bottom surface of the flange 13 respectively. The central portion of the member 16 is drilled to form a bore 17. This bore has a vertical axis, extends from the top face of the member 16 to the bottom face and forms a bearing for a vertically extending sleeve 18. The latter is preferably formed of cast metal and has the central or intermediate outer peripheral part thereof ground so that it fits accurately and rotates readily in the bore 17. The upper end of the sleeve 18 is provided with a polygonal shoulder 19 which projects outwardly from the sleeve and is adapted to rest upon the top face of the cylindrical member 16. In addition to the shoulder 19 the upper end of the sleeve 18 is provided with an internal screw thread 20 whereby the sleeve is connectable to a gas supply pipe 21. The latter is provided with a cock 22 which is operative to control the supply of gas to the meter A through the sleeve 18 and the inlet tube $a'$. The lower end of the sleeve 18 is extended so that it projects downwardly a short distance beneath the bottom face of the member 16. The extended portion of the sleeve is provided with an external screw thread 23 for a nut 24. The latter is adapted to engage the bottom face of the member 16 and operates in conjunction with the shoulder 19 to hold the sleeve against rotation and axial displacement. A characteristic and an advantage of having the nut at the lower end of the sleeve and the shoulder 19 at the upper end is that installation or assembly of the device is facilitated by reason of the fact that it is possible to connect the sleeve to the gas supply pipe 21 and then shift the crossbar upwardly so that the sleeve is inserted within the bore 17. In addition to the external screw thread 23 the lower end of the sleeve 18 is provided with an internal screw thread 25. The sleeve is connected to the inlet tube $a'$ of the meter by a depending offset nipple 26. This nipple is provided at its upper end with an external screw thread 27 which coacts with the internal screw thread 25 to hold the sleeve and the nipple in connected relation. A coupling ring 28 engages a flange 29 on the lower end of the nipple 26 and is internally threaded to engage the screw thread $a^3$ on the inlet tube $a'$ for the purpose of connecting the nipple and the tube and forming a gas tight connection therebetween. By employing a sleeve of the character set forth as the connecting medium between the gas supply pipe 21 and the nipple 26 the work of installing or applying the device is greatly facilitated for the reason that when the nut 24 is loosened it is possible to swing the nipple into proper registration with the inlet tube $a'$ simply by rotating the sleeve. The polygonal shoulder 19 at the upper end of the sleeve permits a wrench or similar turning tool to be applied for use in effecting rotation of the sleeve.

The crossbar 10 is provided at the end thereof that is opposite to the sleeve 18 with a cylindrical member 30. This member is similar in shape and arrangement to the member 16 and is provided with a central bore 31. The latter extends from the upper end of the member 30 to the lower end and forms a bearing for a vertically extending sleeve 32. The latter, like the sleeve 18, is preferably formed of cast metal and has the central or intermediate outer peripheral portion thereof ground so that it fits accurately and rotatably in the bore 31. The upper end of the sleeve 32 is provided with an internal screw thread 33 and a polygonal shoulder 34. The latter projects outwardly and is adapted to rest upon the top face of the cylindrical member 30. The internal screw thread 33 permits the sleeve 32 to be connected to a service pipe 35 which is connected to deliver gas from the meter A to the various points of consumption. The lower end of the sleeve 32 is extended so that it projects below the member 30 and embodies an external screw thread 36 for a nut 37. The latter is adapted when tightened to clamp the shoulder 34 against the top face of the member 30 so as to hold the sleeve against longitudinal and rotative displacement relatively to the bore 31. In addition to the external screw thread 36 the lower end of the sleeve 32 embodies an internal screw thread 38 which is adapted to be connected to an external screw thread 39 on the upper end of a depending offset nipple 40. The latter is similar in size and construction to the nipple 26 and operates to conduct the gas from the outlet tube $a^2$ to the service pipe 35 via the sleeve 32. A coupling ring 41 engages a flange 42 on the lower end of the nipple 40 and is internally threaded so as to receive the screw thread $a^4$ on the tube $a^2$. By virtue of the fact that the nipple 40 is of the offset or swivel variety, the spacing between the rings 28 and 41 may be varied in order to bring the rings into registration with the tubes $a'$ and $a^2$. Swinging of the nipple 40 is effected by loosening the nut 37 and then rotating the sleeve 32 with a wrench applied to the shoulder 34.

In practice the various parts of the meter connecting device, including the crossbar 10, the sleeve 18 and 32 and the nipples 26 and 40, are assembled at the factory and shipped to the user as a unitary device. In installing the device the nipples and the clamp-nuts 24 and 37 are first disconnected from the sleeves. Thereafter the sleeves are removed from the bores 17 and 31 and applied separately to the supply and service pipes. Upon applying the sleeves to the gas pipes the crossbar 10 is shifted upwardly so as to cause the sleeves to be inserted into the bores 17 and 31. Connection of the crossbar and sleeves is then effected by rotating the nuts 24 and 37 into engagement with the externally threaded portions of the sleeves. By tightening the nuts the sleeves are locked in the bores against both axial and rotative displacement. Upon connection of the crossbar to the sleeves the nipples 26 and 40 are rotated so as to effect engagement of the coacting screw threads. Adjustment of the coupling rings 28 and 41 relatively to the tubes $a'$ and $a^2$ of the meter is effected by rotating the nipples. This, as previously described, is accomplished by loosening the nuts 24 and 37 and rotating the sleeves so as to swing the coupling rings towards or away from each other. After adjustment of the nipples into the proper position the meter A is raised and connected in place by rotating the coupling rings 28 and 41 into engagement with the screw threads $a^3$ and $a^4$ on the tubes.

In connecting the crossbar 10 to the sleeves 18 and 32, after the latter have been attached to the gas supply and service pipes the sleeve 18 is usually clamped in place by the nut 24 before the nut 37 is connected to the sleeve 32. In connecting the nut 37 to the sleeve 32 it is necessary whenever the service pipe 35 is not properly positioned with respect to the supply pipe 21 to hold the sleeve in the bore 31 so as to permit the nut to be rotated into engagement with the external screw thread 36 for the purpose of locking the sleeve 32 to the crossbar. In order to permit of the ready application of the nut 37 a tool 43 is provided. This tool comprises a body part 44 which is adapted to fit between the flanges 12 and 13 of the crossbar as indicated in Figure 5. In addition to the body-part 44 the tool comprises an arm 45 which extends upwardly and is provided with a finger 46 for engaging the top face of the polygonal shoulder 34. When the body-part 44 is interlocked with the flanges 12 and 13 the tool may be shifted outwardly so as to bring the finger 46 over the shoulder 34. In this position of the finger the sleeve 32 is locked in place against axial movement in the bore 31 of the crossbar and the nut 37 may be readily applied. To hold the tool 45 in place but one hand need be used. This makes it possible to use the other hand in connection with the application of the nut 37. By virtue of the fact that the flanges 12 and 13 of the crossbar project from both sides of the web 11, the tool may be interlocked with either end of the bar and used in connection with either of the sleeves.

In some instances it is desirable to support the meter A from the crossbar 10 by a hanger 47 which is adapted to extend under the meter and then upwardly along the sides thereof. To provide for the attachment of the upper ends of the hanger an apertured lug 48 is formed integrally with the outer portion of each of the cylindrical members at the ends of the crossbar.

The meter connecting devices herein disclosed may be manufactured at a comparatively low cost by virtue of the fact that it embodies but a small number of parts. In view of the fact that the sleeves at the ends of the crossbar are constructed and arranged so that the polygonal shoulders are at the upper ends and the clamp-nuts at the lower ends, installation of the device is facilitated. The I-beam construction of the crossbar, as hereinbefore described, tends toward rigidity and compactness of construction. By providing a tool which is adapted to interlock with either end of the crossbar and operates when in interlocked relation to lock the sleeve with which it is associated in place, connection of such sleeve to the crossbar may be readily accomplished.

The invention is not to be understood as restricted to the details set forth, since these may be modified within the scope of the appended claim, without departing from the spirit and scope of the invention.

Having thus described the invention, what I claim as new and desire to secure by Letters Patent, is:

A connection for holding in spaced relation the tubes of a gas meter, comprising in combination a rigid bar adapted to extend substantially horizontally and provided at the ends thereof with vertical sockets extending therethrough, a pair of vertical sleeve-members embodying at the upper ends thereof polygonal shoulders for turning purposes and internal screw threads whereby they may be connected to the lower ends of a pair of vertical gas pipes, said members being insertable into the sockets while in connected relation with the pipes by shifting the bar upwardly towards the pipes, and shaped to fit accurately and rotatably in the sockets, nuts mounted on the lower ends of the members for holding said members against vertical and rotative displacement with respect to the bar after insertion into the sockets, and coupling nipples connected to and depending from the said lower ends of the sleeve-members and provided with means at the lower ends thereof for connection to the tubes of the meter.

Signed at Rockford, Illinois, this 26th day of March, 1930.

GARNET W. McKEE.